United States Patent
Chen et al.

(10) Patent No.: US 9,210,778 B2
(45) Date of Patent: Dec. 8, 2015

(54) INTEGRATED WIRELESS AND WIRED LIGHT CONTROL SYSTEM

(71) Applicant: Lextar Electronics Corporation, Hsinchu (TW)

(72) Inventors: Yuan-Ching Chen, Kaohsiung (TW); Chun-Kuang Chen, Taipei (TW)

(73) Assignee: LEXTAR ELECTRONICS CORPORATION, Hsinchu (TW)

( * ) Notice: Subject to any disclaimer, the term of this patent is extended or adjusted under 35 U.S.C. 154(b) by 154 days.

(21) Appl. No.: 14/187,339

(22) Filed: Feb. 24, 2014

(65) Prior Publication Data
US 2015/0008846 A1 Jan. 8, 2015

(30) Foreign Application Priority Data
Jul. 8, 2013 (TW) .............................. 102124414 A (51) Int. Cl.
| | |
|---|---|
| *G05F 1/00* | (2006.01) |
| *H05B 37/02* | (2006.01) |
| *H05B 39/04* | (2006.01) |
| *H05B 41/36* | (2006.01) |
| *H04L 29/06* | (2006.01) |
| *H04L 12/28* | (2006.01) |

(52) U.S. Cl.
CPC .......... *H05B 37/0272* (2013.01); *H04L 12/282* (2013.01); *H04L 69/18* (2013.01)

(58) Field of Classification Search
USPC ....................................... 315/294; 307/38–41
See application file for complete search history.

(56) References Cited

U.S. PATENT DOCUMENTS

| | | | | |
|---|---|---|---|---|
| 6,528,954 | B1 * | 3/2003 | Lys ...................... | A61N 5/0616 315/158 |
| 7,429,117 | B2 * | 9/2008 | Pohlert ................... | G03B 15/02 348/E5.029 |
| 8,214,084 | B2 * | 7/2012 | Ivey ................... | H05B 33/0854 315/291 |
| 8,742,694 | B2 * | 6/2014 | Bora .................. | H05B 33/0863 315/113 |
| 9,089,227 | B2 * | 7/2015 | Pas .......................... | A47F 11/10 |
| 2013/0181630 | A1 * | 7/2013 | Taipale .............. | H05B 37/0263 315/224 |

(Continued)

FOREIGN PATENT DOCUMENTS

| | | |
|---|---|---|
| TW | 595261 | 6/2004 |
| TW | M324747 U | 1/2008 |

(Continued)

*Primary Examiner* — Adam Houston
(74) *Attorney, Agent, or Firm* — CKC & Partners Co., Ltd.

(57) ABSTRACT

A light control system includes a wired control device, a wireless control device, a communication module, and light devices. The wired control device includes a first user interface and a first wired communication protocol interface. The wireless control device includes a second user interface and a first wireless communication protocol interface. The communication module includes a second wired communication protocol interface and a second wireless communication protocol interface. Each of the light devices includes a third wired communication protocol interface, and each of the light devices performs data exchange with the third wired communication protocol interface of another one of the light devices by a network cable connected to the third wired communication protocol interface. The first wired communication protocol interface and the first wireless communication protocol interface perform data exchange respectively with the second wired communication protocol interface and the second wireless communication protocol interface.

21 Claims, 6 Drawing Sheets

(56) References Cited

U.S. PATENT DOCUMENTS

| | | | |
|---|---|---|---|
| 2014/0062309 A1* | 3/2014 | Kim | H05B 37/0227 315/132 |
| 2014/0175875 A1* | 6/2014 | Newman, Jr. | H04L 69/18 307/18 |
| 2014/0180487 A1* | 6/2014 | Bull | H04L 12/12 700/295 |
| 2014/0225528 A1* | 8/2014 | Clayton | G05B 11/01 315/294 |
| 2014/0254477 A1* | 9/2014 | Fricke | H04W 12/04 370/328 |
| 2014/0265880 A1* | 9/2014 | Taipale | H05B 37/0263 315/158 |
| 2015/0008846 A1* | 1/2015 | Chen | H04L 69/18 315/294 |
| 2015/0137699 A1* | 5/2015 | Killo | H05B 37/0272 315/291 |
| 2015/0177709 A1* | 6/2015 | Gill | G05B 11/01 160/7 |
| 2015/0185752 A1* | 7/2015 | Bard | G05F 1/66 700/296 |
| 2015/0249336 A1* | 9/2015 | Raneri | H02J 3/005 705/35 |
| 2015/0256971 A1* | 9/2015 | Arvidsson | H04W 4/021 370/466 |

FOREIGN PATENT DOCUMENTS

| | | |
|---|---|---|
| TW | 201028030 A | 7/2010 |
| TW | I389488 B | 3/2013 |

\* cited by examiner

INTEGRATED WIRELESS AND WIRED LIGHT CONTROL SYSTEM

RELATED APPLICATIONS

This application claims priority to Taiwan Application Serial Number 102124414, filed Jul. 8, 2013, which is herein incorporated by reference.

BACKGROUND

1. Field of Invention

The present invention relates to an integrated wired and wireless light control system.

2. Description of Related Art

Light control systems in the prior art (for example, DMX512) use RS485 as the hardware communication interface, and the communication method of such light control systems includes a simplex communication method and a full deplux communication method. Simplex communication refers to a technique in which the parties involved play a sending role or a receiving role. In full deplux communication, the parties involved can play both a sending role and a receiving role, and both roles can be independently operated.

The simplex communication method only allows unidirectional transmission so only one main controller is allowed in a control loop, and other devices in the control loop are subsidiary devices and controlled by the main controller. The subsidiary devices cannot provide a feedback signal to the main controller, and cannot send signals to each other. Data of the main controller and data of subsidiary devices cannot be synchronously updated so it is not convenient for users.

The full deplux communication method allows communication in both sending and receiving directions. Although a light control system utilizing the full deplux communication method provides greater convenience for users, the light control system needs to further install a pair of wires (Rx+ and Rx-). As a result, the costs associated with wiring are increased, as are the costs of the integrated circuit of the RS485 interface in the light control system.

SUMMARY

An aspect of the present invention is to provide an integrated wired and wireless light control system.

According to one embodiment of the present invention, an integrated wired and wireless light control system includes a wired control device, a wireless control device, a communication module, and N light devices. The wired control device includes a first user interface and a first wired communication protocol interface. The wireless control device includes a second user interface and a first wireless communication protocol interface. The communication module includes a second wired communication protocol interface and a second wireless communication protocol interface. Each of the light devices includes a third wired communication protocol interface, and each of the light devices performs data exchange with the third wired communication protocol interface of another one of the light devices by a network line connected to the third wired communication protocol interface. N is a natural number larger than 1. The first wired communication protocol interface can directly perform data exchange with the second wired communication protocol interface, and the first wireless communication protocol interface can directly perform data exchange with the second wireless communication protocol interface.

In one embodiment of the present invention, the wired control device further includes a first microprocessor. The first microprocessor is connected to the first user interface and the first wired communication protocol interface. The first microprocessor receives a dimming signal from the first user interface and packages the dimming signal into a first protocol packet, and the first protocol packet is sent to the second wired communication protocol interface of the communication module by the first wired communication protocol interface.

In one embodiment of the present invention, the wireless control device further includes a second microprocessor. The second microprocessor is connected to the second user interface and the first wireless communication protocol interface. The second microprocessor receives a dimming signal from the second user interface and packages the dimming signal interface into a second protocol packet, and the second protocol packet is sent to the second wireless communication protocol interface of the communication module by the first wireless communication protocol interface.

In one embodiment of the present invention, the communication module is disposed exterior to and independent of the light devices. The communication module further includes a third microprocessor. The third microprocessor is connected to the second wireless communication protocol interface and the second wired communication protocol interface. When the second wired communication protocol interface of the communication module receives the first protocol packet, the first protocol packet is sent to the third wired communication protocol interface of one of the light devices by the second wired communication protocol interface. The first protocol packet is sent to another one of the light devices that is connected to said one of the light devices. The first protocol packet is also sent to the first wireless communication protocol interface by the third microprocessor and the second wireless communication protocol interface that is connected to the third microprocessor so as to synchronize the dimming parameters of the second user interface of the wireless control device. When the second wireless communication protocol interface of the communication module receives the second protocol packet, the second protocol packet is sent to the third wired communication protocol interface of one of light devices by the third microprocessor and the second wired communication protocol interface that is connected to the third microprocessor. The second protocol packet is sent to another one of the light devices that is connected to said one of the light devices. The second protocol packet is also sent to the first wired communication protocol interface by the third microprocessor and the second wired communication protocol interface that is connected to the third microprocessor so as to synchronize the dimming parameters of the first user interface of the wired control device.

In one embodiment of the present invention, each of the light devices further includes a light source, a light source driver, and a fourth microprocessor. The light source driver is electrically connected to the light source. The fourth microprocessor is connected to the light source driver and the third wired communication protocol interface. The first protocol packet or the second protocol packet received by the third wired communication protocol interface is processed by the fourth microprocessor, such that a new dimming parameter signal is generated and sent to the light source driver to control the light source by the fourth microprocessor.

In one embodiment of the present invention, each of the first and the second wireless communication protocol interfaces is a 3G interface, 4G interface, Wimax interface, Bluetooth interface, WiFi interface, or ZigBee interface.

In one embodiment of the present invention, the first, second, and third wired communication protocol interfaces are half-deplux RS485 communication protocol interfaces.

In one embodiment of the present invention, the dimming parameters of the first and the second user interfaces are color temperature, brightness, light beam angles, lighting duration, or combinations thereof.

In one embodiment of the present invention, the wireless control device is a mobile calculation device.

In one embodiment of the present invention, the mobile calculation device is a smart mobile calculation device, and an operating system of the smart mobile calculation device is iOS, Android, or Windows that functions to load an APP (mobile application) for wirelessly controlling light devices.

An aspect of the present invention is to provide an integrated wired and wireless light control system.

According to one embodiment of the present invention, an integrated wired and wireless light control system includes a wired control device, a wireless control device, a communication module, M first light devices, and a second light device. The wired control device includes a first user interface and a first wired communication protocol interface. The wireless control device includes a second user interface and a first wireless communication protocol interface. The communication module includes a second wired communication protocol interface and a second communication protocol interface. Each of the first light devices includes a third wired communication protocol interface, and each of the first light devices performs data exchange with the third wired communication protocol interface of another one of the first light devices by a network cable connected to the third wired communication protocol interface. M is a natural number larger than 1. The second light device includes an embedded communication module. The first wired communication protocol interface can directly perform data exchange with the second wired communication protocol interface, and the first wireless communication protocol interface can directly perform data exchange with the second wireless communication protocol interface.

In one embodiment of the present invention, the wired control device further includes a first microprocessor. The first microprocessor is connected to the first user interface and the first wired communication protocol interface. The first microprocessor receives a dimming signal from the first user interface and packages the dimming signal into a first protocol packet. The first protocol packet is sent to the second wired communication protocol interface of the communication module by the first wired communication protocol interface.

In one embodiment of the present invention, the wireless control device further includes a second microprocessor. The second microprocessor is connected to the second user interface and the first wireless communication protocol interface. The second microprocessor receives a dimming signal from the second user interface and packages the dimming signal into a second protocol packet. The second protocol packet is sent to the second wireless communication protocol interface of the communication module by the first wireless communication protocol interface.

In one embodiment of the present invention, the communication module further includes a third microprocessor. The third microprocessor is connected to the second wireless communication protocol interface and the second wired communication protocol interface. When the second wired communication protocol interface of the communication module receives the first protocol packet, the first protocol packet is sent to the third wired communication protocol interface of one of the first light devices by the second wired communication protocol interface. The first protocol packet is continuously sent to the third wired communication protocol interface of another one of the first light devices. The first protocol packet is also sent to the first wireless communication protocol interface by the third microprocessor and the second wireless communication protocol interface that is connected to the third microprocessor so as to synchronize the dimming parameters of the second user interface of the wireless control device. When the second wireless communication protocol interface of the communication module receives the second protocol packet, the second protocol packet is sent to the third wired communication protocol interface of one of the first light devices by the third microprocessor and the second wired communication protocol interface that is connected to the third microprocessor. The second protocol packet is sent to another one of the first light devices that is connected to said one of the first light devices. The second protocol packet is also sent to the first wired communication protocol interface by the third microprocessor and the second wired communication protocol interface that is connected to the third microprocessor so as to synchronize the dimming parameters of the first user interface of the wired control device.

In one embodiment of the present invention, each of the first light devices further includes a first light source, a first light source driver, and a fourth microprocessor. The first light source driver is electrically connected to the first light source. The fourth microprocessor is connected to the first light source driver and the third wired communication protocol interface. The first protocol packet or the second protocol packet received by the third wired communication protocol interface is processed by the fourth microprocessor such that a new dimming parameter signal is generated and sent to the first light source driver to control the first light source by the fourth microprocessor.

In one embodiment of the present invention, the second light device further includes a second light source, and a second light source driver. The second light source driver is electrically connected to the second light source, and the second light source driver is connected to the third microprocessor. The first protocol packet received by the second wired communication protocol interface is processed by the third microprocessor, or the second protocol packets by the second wired communication protocol interface is processed by the third microprocessor, such that a new dimming parameter signal is generated and sent to the second light source driver to control the second light source by the third microprocessor.

In one embodiment of the present invention, each of the first and the second wireless communication protocol interfaces is a 3G interface, 4G interface, Wimax interface, Bluetooth interface, WiFi interface, or ZigBee interface.

In one embodiment of the present invention, the first, second, and third wired communication protocol interfaces are half-deplux RS485 communication protocol interfaces.

In one embodiment of the present invention, the dimming parameters of the first and second user interfaces are color temperature, brightness, light beam angles, lighting times, or combinations thereof.

In one embodiment of the present invention, the wireless control device is a mobile calculation device.

In one embodiment of the present invention, the mobile calculation device is a smart mobile calculation device, and an operating system of the smart mobile calculation device is iOS, Android, or Windows that functions to load an APP (mobile application) for wirelessly controlling light devices.

In the aforementioned embodiments of the present invention, since the first wired communication protocol interface of the wired control device can directly perform data exchange with the second wired communication protocol interface of the communication module, and the first wireless communication protocol interface of the wireless control device can directly perform data exchange with the second wireless communication protocol interface of the communication module, when the light control system is in use, the light control system can use the first user interface of the wired control device or the second user interface of the wireless control device to input the dimming signal. When the first user interface of the wired control device inputs the dimming signal, the communication module receives the dimming signal to control the light of the light device connected to the communication module, and to synchronize the dimming parameters of the second user interface of the wireless control device. Moreover, when the second user interface of the wireless control device inputs the dimming signal, the communication module receives the dimming signal to control the light of the light device connected to the communication module, and to synchronize the dimming parameters of the first user interface of the wired control device.

That is to say, the communication method of the light control system allows bi-directional communication. A plurality of main controllers (such as the wired control device and the wireless control device) are allowed to input the dimming signal in a single control loop, and the first user interface of the wired control device and the second user interface of the wireless control device can update the dimming parameters synchronously, such that it is very convenient for users. In addition, the light control system of the present invention does not need to additionally install a pair of wires (Rx+ and Rx−). Therefore, the costs associated with wiring and the costs of the integrated circuits of the wired communication protocol interfaces are not increased.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiments, with reference made to the accompanying drawings as follows.

DETAILED DESCRIPTION

Reference will now be made in detail to the present embodiments of the invention, examples of which are illustrated in the accompanying drawings. Wherever possible, the same reference numbers are used in the drawings and the description to refer to the same or like parts.

Figure 1:
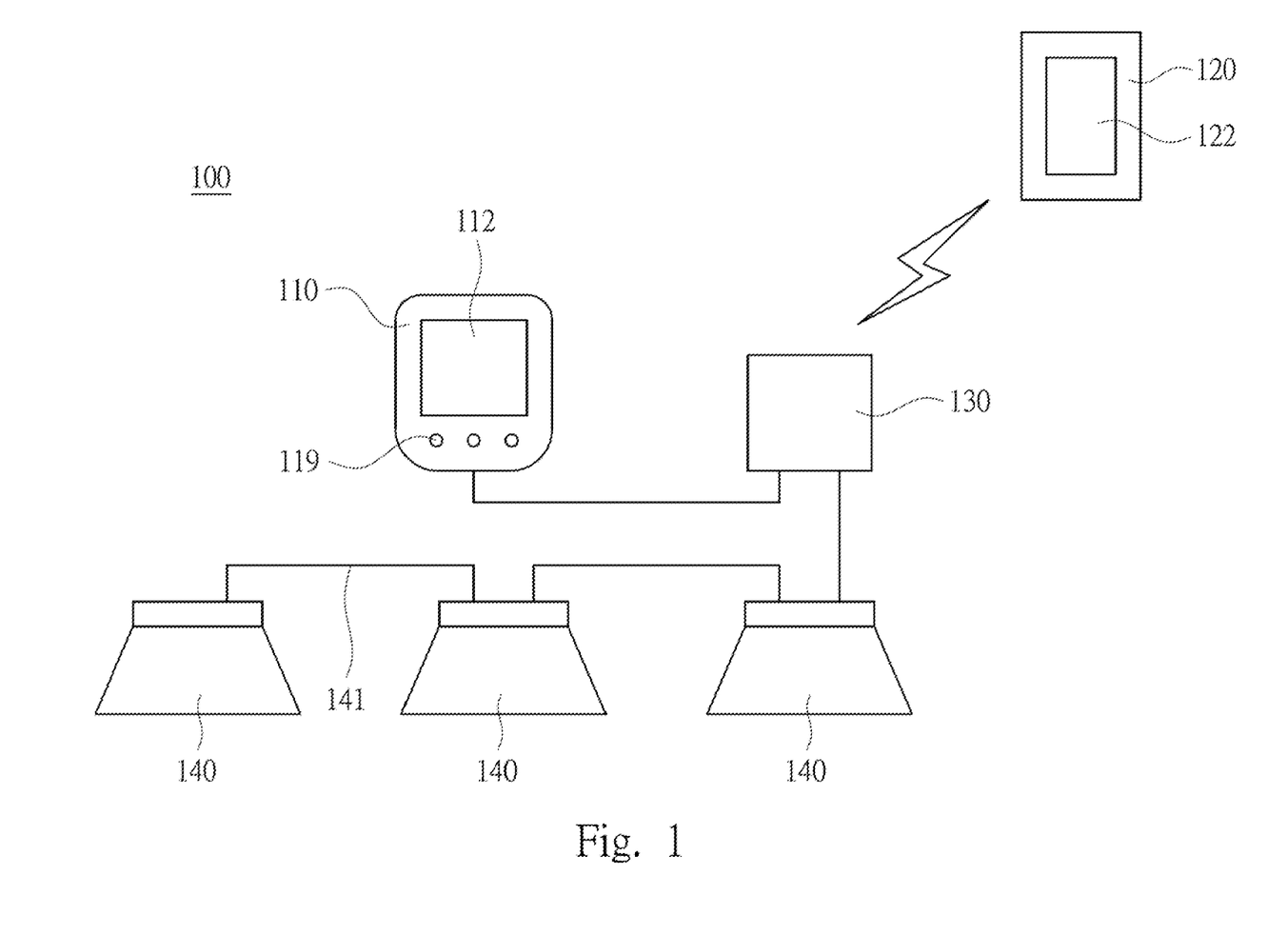
FIG. 1 is a schematic view of a light control system according to one embodiment of the present invention.
Figure 2:
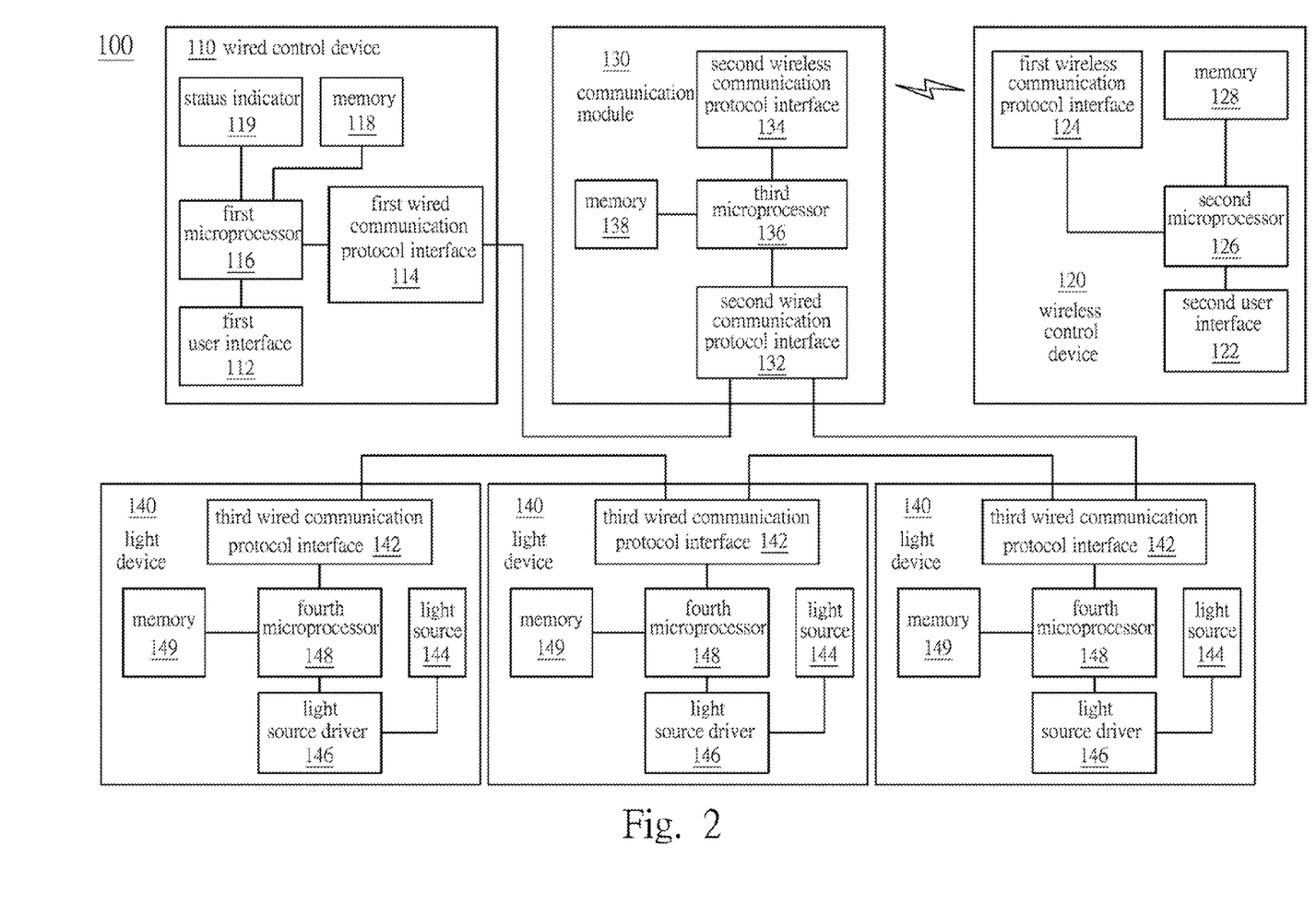
FIG. 2 is a block diagram of the light control system shown in FIG. 1.

FIG. 1 illustrates a schematic view of a light control system 100 according to one embodiment of the present invention, and FIG. 2 illustrates a block diagram of the light control system 100 shown in FIG. 1. Referring to FIGS. 1 and 2, the integrated wireless and wired light control system 100 includes a wired control device 110, a wireless control device 120, a communication module 130, and N light devices 140. N is the number of the light devices 140, and is a natural number larger than 1. In this embodiment, the light control system 100 includes three light devices 140 (i.e., N is equal to 3), but the present invention in not limited in this regard. The communication module 130 may be a Bluetooth module, and is located exterior to and independent of the light devices 140 (as shown in FIG. 1). The wired control device 110 may be a wall dimmer that is fixed to a wall. The wireless control device 120 may be a mobile calculation device and carried by the user. The mobile calculation device may be a smart mobile calculation device, and an operating system thereof may be iOS, Android, or Windows that functions to load an APP (mobile application) for wirelessly controlling light devices. For example, the wireless control device 120 may be a smart phone or a tablet computer.

The wired control device 110 includes a first user interface 112 and a first wired communication protocol interface 114. The wireless control device 120 includes a second user interface 122 and a first wireless communication protocol interface 124. The communication module 130 includes a second wired communication protocol interface 132 and a second wireless communication protocol interface 134. The first wired communication protocol interface 114 can directly perform data exchange with the second wired communication protocol interface 132, and the first wireless communication protocol interface 124 can directly perform data exchange with the second wireless communication protocol interface 134. Each of the first and second wireless communication protocol interfaces 124, 134 may be a 3G interface, 4G interface, Wimax interface, Bluetooth interface, WiFi interface, or ZigBee interface.

In addition, each of the light devices 140 includes a third wired communication protocol interface 142, and each of the light devices 140 can perform data exchange with the third wired communication protocol interfaces 142 of other light devices 140 by a network cable 141 connected with the third wired communication protocol interfaces 142. Each of the first, second, and third wired communication protocol interface 114, 132, 142 may be a half-deplux RS485 communication protocol interface, and the network cable 141 may be a RS485 cable.

In this embodiment, the wired control device 110 may further include a first microprocessor 116, a memory 118, and a status indicator 119. The first microprocessor 116 is connected to the first user interface 112, the first wired communication protocol interface 114, the memory 118, and the status indicator 119. In use, the first microprocessor 116 can receive a dimming signal from the first user interface 112 and packages the dimming signal into a first protocol packet. The first protocol packet is sent to the second wired communication protocol interface 132 of the communication module 130 by the first wired communication protocol interface 114.

Furthermore, the memory 118 may store the dimming parameters of the first user interface 112 to enable quick search by users. The status indicator 119 indicates the status of the wired control device 110, such as "turn on," "turn off," "send," "receive," etc.

The wireless control device 120 may further include a second microprocessor 126 and a memory 128. The second microprocessor 126 is connected to the second user interface 122 and the first wireless communication protocol interface 124. In use, the second microprocessor 126 receives a dimming signal from the second user interface 122 and packages the dimming signal into a second protocol packet. The second protocol packet is sent to the second wireless communication protocol interface 134 of the communication module 130 by the first wireless communication protocol interface 124. Moreover, the memory 128 may store the dimming parameters of the second user interface 122 to enable quick search by users.

The communication module 130 further includes a third microprocessor 136 and a memory 138. The third microprocessor 136 is connected to the second wireless communication protocol interface 134 and the second wired communication protocol interface 132. When the second wired communication protocol interface 132 of the communication module 130 receives the first protocol packet, the first protocol packet is sent to the third wired communication protocol interface 142 of one of light devices 140 by the second wired communication protocol interface 132. Thereafter, the first protocol packet is further sent to another one of the light devices 140 that is connected to said one of the light devices 140. The first protocol packet is also sent to the first wireless communication protocol interface 124 by the third microprocessor 136 and the second wireless communication protocol interface 134 that is connected to the third microprocessor 136 so as to synchronize the dimming parameters of the second user interface 122 of the wireless control device 120.

Furthermore, when the second wireless communication protocol interface 134 of the communication module 130 receives the second protocol packet, the second protocol packet is sent to the third wired communication protocol interface 142 of one of the light devices 140 by the third microprocessor 136 and the second wired communication protocol interface 132 that is connected to the third microprocessor 136. Thereafter, the second protocol packet can be sent to another one of the light devices 140 that is connected to said one of the light devices 140. Moreover, the second protocol packet is also sent to the first wired communication protocol interface 114 by the third microprocessor 136 and the second wired communication protocol interface 132 that is connected to the third microprocessor 136 so as to synchronize the dimming parameters of the first user interface 112 of the wired control device 110.

In this embodiment, the dimming parameters of the first and the second user interfaces 112 and 122 may be color temperature, brightness, light beam angles, lighting times, or combinations thereof, in accordance with the requirements of designers.

Each of the light devices 140 further includes a light source 144, a light source driver 146, a fourth microprocessor 148, and a memory 149. The light source driver 146 is electrically connected to the light source 144. The fourth microprocessor 148 is connected to the light source driver 146, the third wired communication protocol interface 142, and the memory 149. After the first or the second protocol packet received by the third wired communication protocol interface 142 is processed by the fourth microprocessor 148, a new dimming parameter signal is generated and sent to the light source driver 146 by the fourth microprocessor 148 so as to control the light source 144. The memory 149 can save the latest dimming parameters of the light source driver 146, and the latest dimming parameters can be sent to the first user interface 112 of the wired control device 110 and the second user interface 122 of the wireless control device 120 by the communication module 130 for user reference.

Since the first wired communication protocol interface 114 of the wired control device 110 can directly perform data exchange with the second wired communication protocol interface 132 of the communication module 130, and the first wireless communication protocol interface 124 of the wireless control device 120 can directly perform data exchange with the second wireless communication protocol interface 134 of the communication module 130, when the light control system 100 is in use, users can choose the first user interface 112 of the wired control device 110 or the second user interface 122 of the wireless control device 120 to input the dimming signal.

When users use the first user interface 112 of the wired control device 110 to input the dimming signal, the communication module 130 receives the dimming signals so as to control the light of the light devices 140 connected to the communication module 130 and to synchronize the dimming parameters of the second user interface 122 of the wireless control device 120. Furthermore, when users use the second user interface 122 of the wireless control device 120 to input the dimming signal, the communication module 130 receives the dimming signal so as to control the light of the light devices 140 connected to the communication module 130 and to synchronize the dimming parameters of the first user interface 112 of the wired control device 110.

That is to say, the communication method of the light control system 100 allows bi-directional communication. A plurality of main controllers (such as the wired control device 110 and the wireless control device 120) are allowed to input dimming signals in a single control loop. The first user interface 112 of the wired control device 110 and the second user interface 122 of the wireless control device 120 can update the dimming parameters synchronously, such that users can choose the first user interface 112 of the wired control device 110 or the second user interface 122 of the wireless control device 120 to adjust the dimming parameters of the light devices 140. Moreover, users can see the synchronized dimming parameters shown on the first user interface 112 or the second user interface 122. Therefore, the light control system 100 is very convenient for users. In addition, the light control system 100 does not need to additionally install a pair of wires (Rx+ and Rx−) used in a conventional full deplux light control system, and so the costs associated with wiring and the costs of the integrated circuits of the wired communication protocol interfaces (e.g., RS485) are not increased It is to be noted that the connection relationships of the aforementioned components will not be repeated in the following description.

Figure 3:
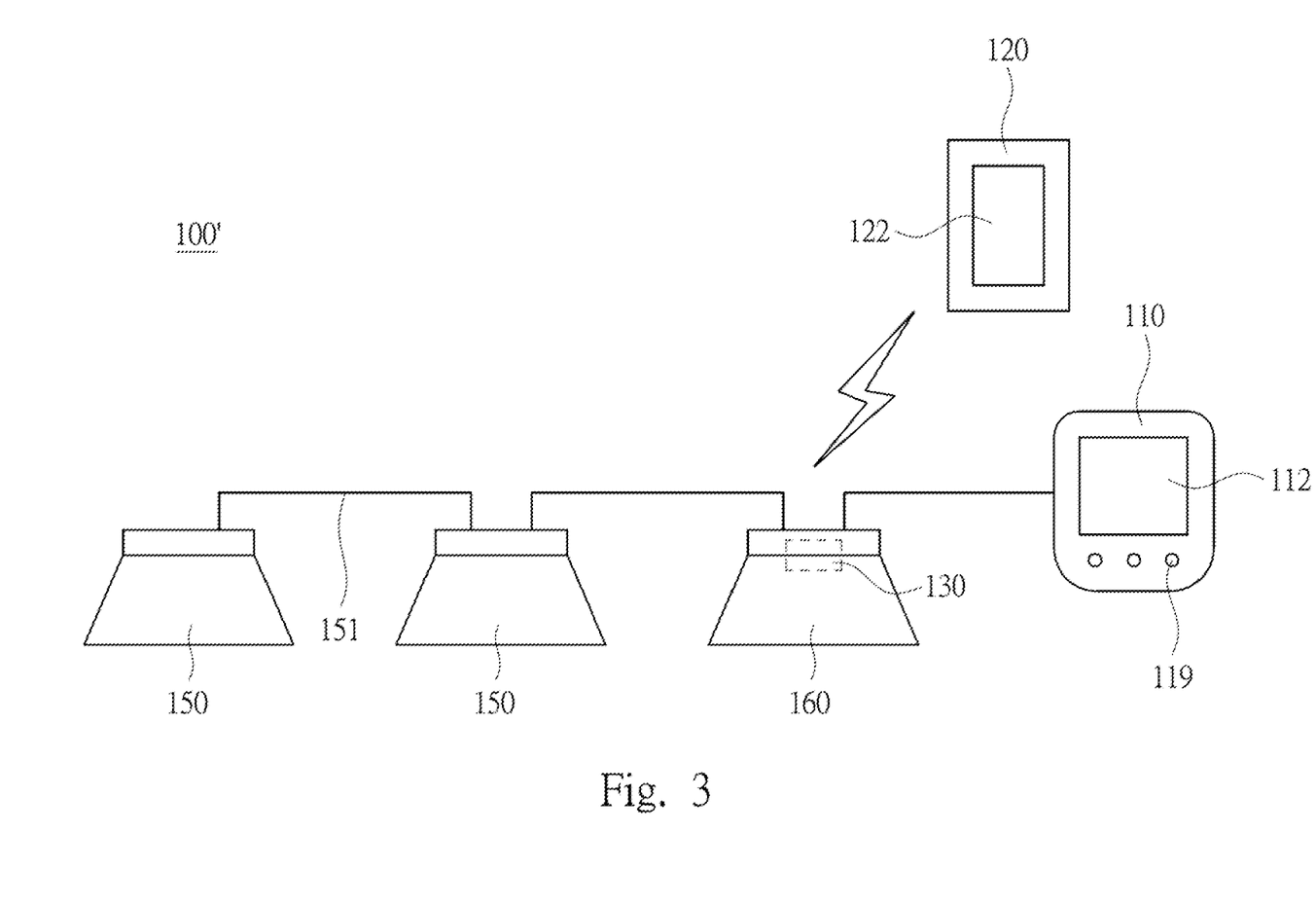
FIG. 3 is a schematic view of a light control system according to one embodiment of the present invention.
Figure 4:
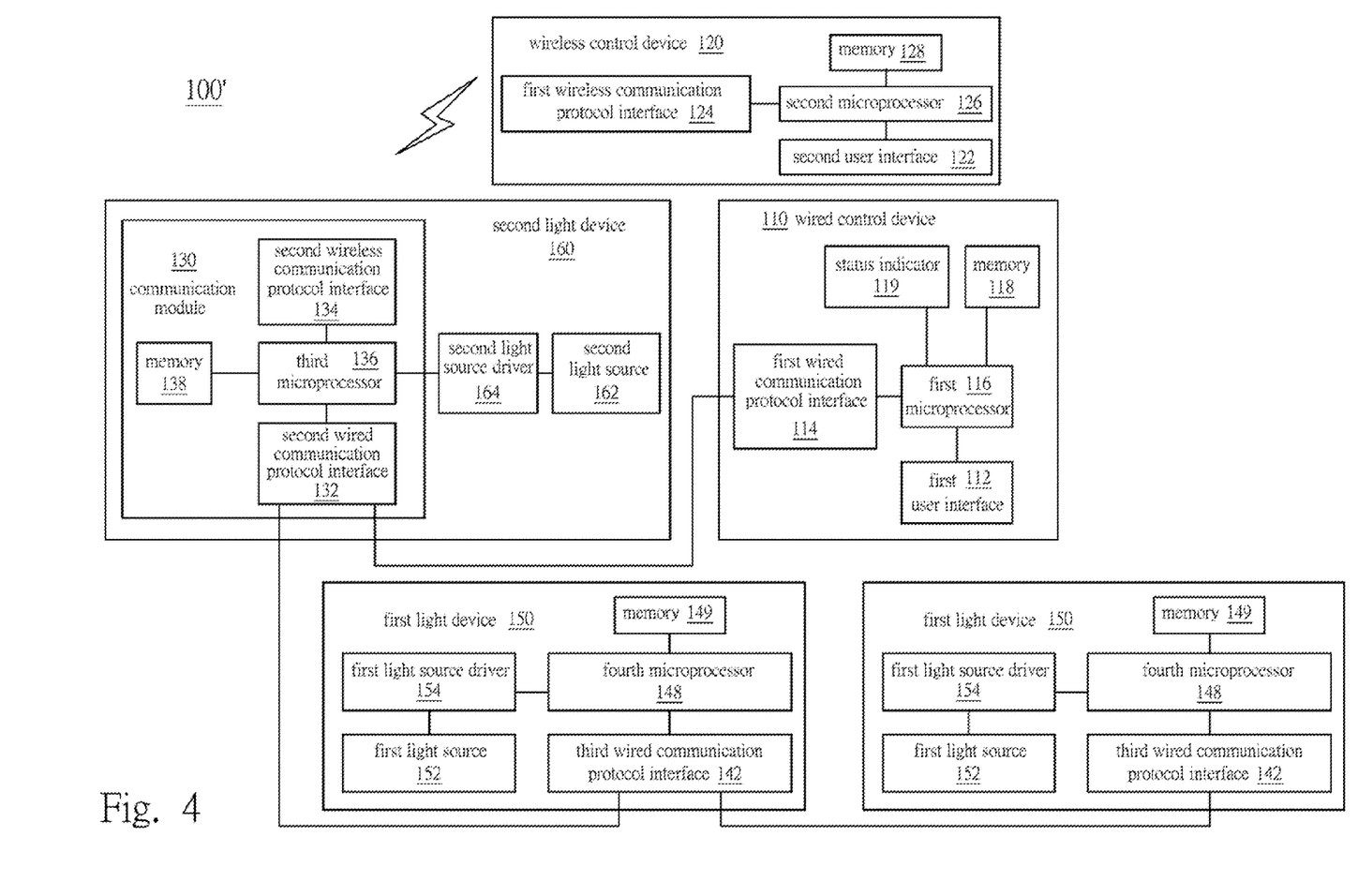
FIG. 4 is a block diagram of the light control system shown in FIG. 3.

FIG. 3 illustrates a schematic view of a light control system 100' according to one embodiment of the present invention, and FIG. 4 is a block diagram of the light control system 100' shown in FIG. 3. Referring to FIGS. 3 and 4, the difference between this embodiment and the embodiment shown in FIGS. 1 and 2 is that the integrated wireless and wired light control system 100' not only includes the wired control device 110, the wireless control device 120, and the communication module 130, but also includes M first light devices 150 and a second light device 160. The second light device 160 includes an embedded communication module 130, and M is a natural number larger than 1. In this embodiment, the light control system 100' includes two first light devices 150 (i.e., M is equal to 2) and a single second light device 160, but the present invention is not limited in this regard. Each of the first light devices 150 includes the third wired communication protocol interface 142, and each of the first light devices 150 can perform data exchange with the third wired communication protocol interface 142 of another one of the first light devices 150 by the network cable 151 connected to the third wired communication protocol interface 142.

When the second wired communication protocol interface 132 of the communication module 130 receives the first protocol packet, the first protocol packet is sent to the third wired communication protocol interface 142 of one of first light devices 150 by the second wired communication protocol interface 132. Thereafter, the first protocol packet can be continuously sent to the third wired communication protocol interface 142 of another one of the first light devices 150, and the first protocol packet is also sent to the first wireless communication protocol interface 124 by the third microprocessor 136 and the second wireless communication protocol interface 134 that is connected to the third microprocessor 136 so as to synchronize the dimming parameters of the second user interface 122 of the wireless control device 120.

Furthermore, when the second wireless communication protocol interface 134 of the communication module 130 receives the second protocol packet, the second protocol packet is sent to the third wired communication protocol interface 142 of one of the first light devices 150 by the third microprocessor 136 and the second wired communication protocol interface 132 connected to the third microprocessor 136. Thereafter, the second protocol packet is sent to another one of the first light devices 150 that is connected to said one of the first light devices 150, and the second protocol packet is also sent to the first wired communication protocol interface 114 by the third microprocessor 136 and the second wired communication protocol interface 132 that is connected to the third microprocessor 136 so as to synchronize dimming parameters of the first user interface 112 of the wired control device 110.

Each of the first light devices 150 further includes a first light source 152, a first light source driver 154, the fourth microprocessor 148, and the memory 149. The first light source driver 154 is electrically connected to the first light source 152. The fourth microprocessor 148 is connected to the first light source driver 154, the third wired communication protocol interface 142, and the memory 149. After the first or the second protocol packet received by the third wired communication protocol interface 142 is processed by the fourth microprocessor 148, a new dimming parameter signal is generated and sent to the first light source driver 154 by the fourth microprocessor 148 so as to control the first light source 152. The memory 149 can save the latest dimming parameters of the first light source driver 154, and the latest dimming parameters can be sent to the first user interface 112 of the wired control device 110 and the second user interface 122 of the wireless control device 120 by the communication module 130 for user reference.

The second light device 160 further includes a second light source 162 and a second light source driver 164. The second light source driver 164 is electrically connected to the second light source 162, and the second light source driver 164 is connected to the third microprocessor 136. After the first protocol packet received by the second wired communication protocol interface 132 or the second protocol packet received by the second wireless communication protocol interface 134 is processed by the third microprocessor 136, a new dimming parameter signal is generated and sent to the second light source driver 164 by the third microprocessor 136 so as to control the second light source 162.

When the light control system 100' is in use, users can choose the first user interface 112 of the wired control device 110 or the second user interface 122 of the wireless control device 120 to adjust the dimming parameters of the first and second light devices 150, 160. Furthermore, users can see the synchronized dimming parameters on the first user interface 112 or the second user interface 122.

Figure 5:
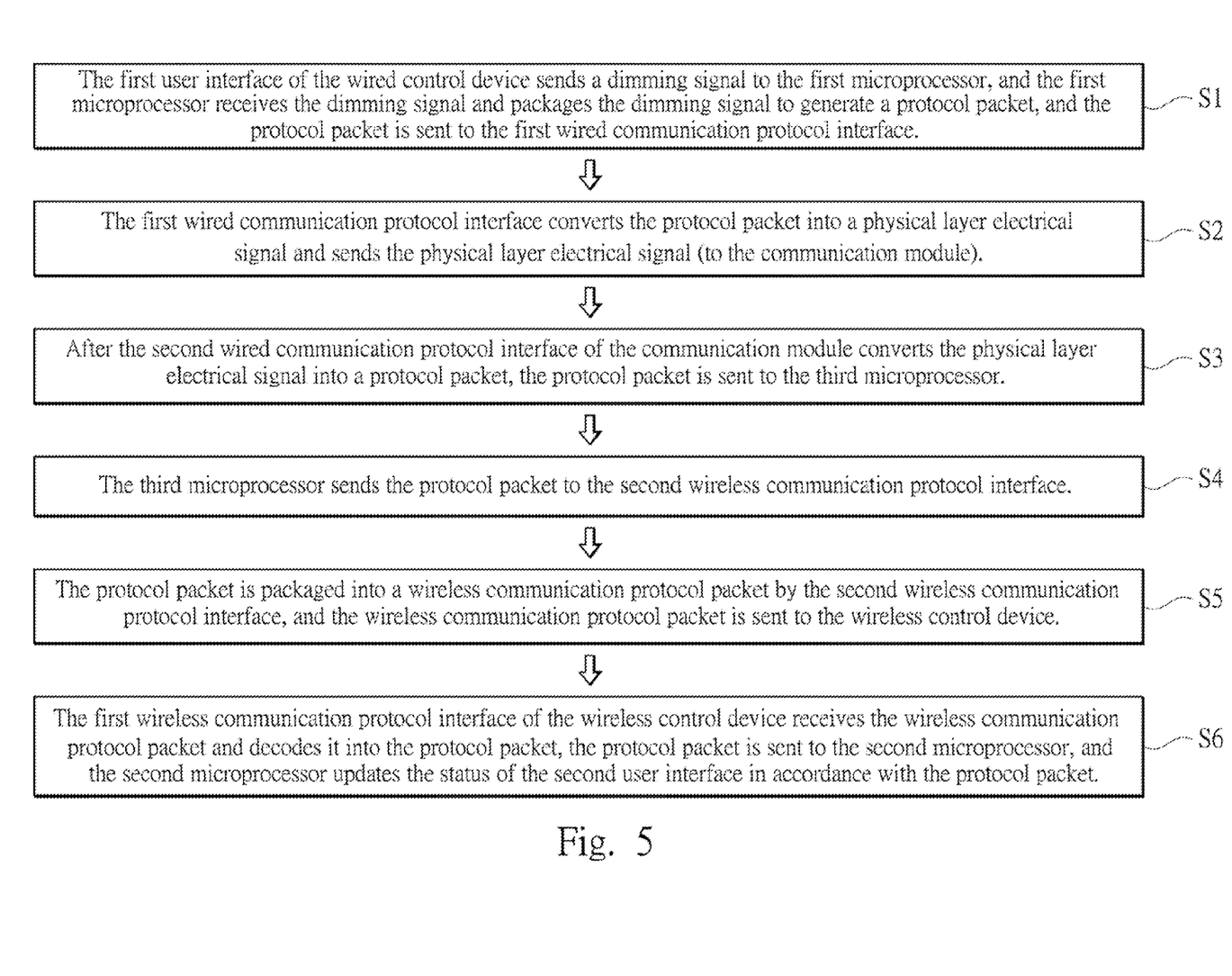
FIG. 5 is a flow chart of a method of using a light control system according to one embodiment of the present invention.

FIG. 5 illustrates a flow chart of a method of using a light control system according to one embodiment of the present invention. In this embodiment, users use the first user interface of the wired control device so as to adjust the dimming parameters of the light devices. The flow chart shown in FIG. 5 is for synchronizing the second user interface of the wireless control device. In step S1, the first user interface of the wired control device sends a dimming signal to the first microprocessor, and the first microprocessor receives the dimming signal and packages the dimming signal to generate a protocol packet, and the protocol packet is sent to the first wired communication protocol interface. Thereafter in step S2, the first wired communication protocol interface packages the protocol packet into a physical layer electrical signal and sends the physical layer electrical signal (to the communication module). Next in step S3, after the second wired communication protocol interface of the communication module converts the physical layer electrical signal into a protocol packet, the protocol packet is sent to the third microprocessor. Thereafter in step S4, the third microprocessor sends the protocol packet to the second wireless communication protocol interface. Next in step S5, the protocol packet is packaged into a wireless communication protocol packet by the second wireless communication protocol interface, and the wireless communication protocol packet is sent to the wireless control device. Finally in step S6, the first wireless communication protocol interface of the wireless control device receives the wireless communication protocol packet and decodes it into the protocol packet, the protocol packet is sent to the second microprocessor, and the second microprocessor updates the status of the second user interface in accordance with the protocol packet.

Figure 6:
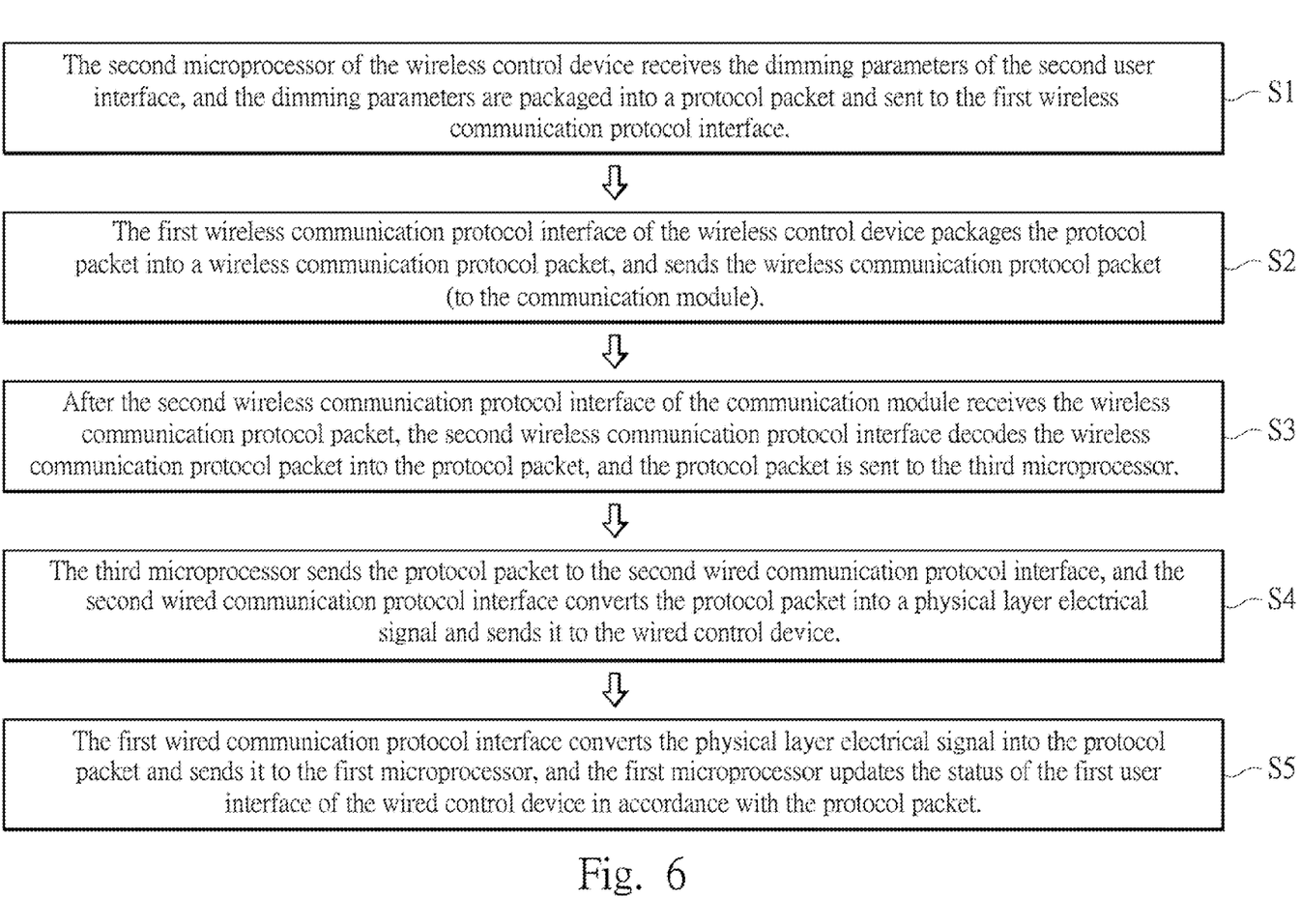
FIG. 6 is a flow chart of a method of using a light control system according to another embodiment of the present invention.

FIG. 6 illustrates a flow chart of a method of using a light control system according to another embodiment of the present invention. In this embodiment, users use the second user interface of the wireless control device to adjust the dimming parameters of the light devices. The flow chart shown in FIG. 6 is for synchronizing the first user interface of the wired control device. In step S1, the second microprocessor of the wireless control device receives the dimming parameters of the second user interface, and the dimming parameters are packaged into a protocol packet and sent to the first wireless communication protocol interface. Thereafter in step S2, the first wireless communication protocol interface of the wireless control device converts the protocol packet into a wireless communication protocol packet, and sends the wireless communication protocol packet (to the communication module). Next in step S3, after the second wireless communication protocol interface of the communication module receives the wireless communication protocol packet, the second wireless communication protocol interface decodes the wireless communication protocol packet into the protocol packet, and the protocol packet is sent to the third microprocessor. Thereafter in step S4, the third microprocessor sends the protocol packet to the second wired communication protocol interface, and the second wired communication protocol interface converts the protocol packet into a physical layer electrical signal and sends it to the wired control device. Finally in step S5, the first wired communication protocol interface converts the physical layer electrical signal into the protocol packet and sends it to the first microprocessor, and the first microprocessor updates the status of the first user interface of the wired control device in accordance with the protocol packet.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. An integrated wired and wireless light control system, comprising:
   a wired control device comprising a first user interface and a first wired communication protocol interface;
   a wireless control device comprising a second user interface and a first wireless communication protocol interface;
   a communication module comprising a second wired communication protocol interface and a second wireless communication protocol interface; and
   N light devices, each of the light devices comprising a third wired communication protocol interface, and each of the light devices performing data exchange with the third wired communication protocol interface of another one of the light devices by a network cable that is connected to the third wired communication protocol interface, wherein N is a natural number larger than 1,
   wherein the first wired communication protocol interface directly performs data exchange with the second wired communication protocol interface, and the first wireless communication protocol interface directly performs data exchange with the second wireless communication protocol interface.

2. The light control system of claim 1, wherein the wired control device further comprises:
   a first microprocessor connected to the first user interface and the first wired communication protocol interface, receiving a dimming signal from the first user interface and packaging the dimming signal into a first protocol packet, and sending the first protocol packet to the second wired communication protocol interface of the communication module by the first wired communication protocol interface.

3. The light control system of claim 2, wherein the wireless control device further comprises:
   a second microprocessor connected to the second user interface and the first wireless communication protocol interface, receiving a dimming signal from the second user interface and packaging the dimming signal into a second protocol packet, and sending the second protocol packet to the second wireless communication protocol interface of the communication module by the first wireless communication protocol interface.

4. The light control system of claim 3, wherein the communication module is disposed exterior to and independent of the light devices, and the communication module further includes a third microprocessor connected to the second wireless communication protocol interface and the second wired communication protocol interface,
   wherein when the second wired communication protocol interface of the communication module receives the first protocol packet, the first protocol packet is sent to the third wired communication protocol interface of one of the light devices by the second wired communication protocol interface, and the first protocol packet is sent to another one of the light devices that is connected to said one of the light devices, and the first protocol packet is also sent to the first wireless communication protocol interface by the third microprocessor and the second wireless communication protocol interface that is connected to the third microprocessor so as to synchronize dimming parameters of the second user interface of the wireless control device;
   wherein when the second wireless communication protocol interface of the communication module receives the second protocol packet, the second protocol packet is sent to the third wired communication protocol interface of one of the light devices by the third microprocessor and the second wired communication protocol interface that is connected to the third microprocessor, and the second protocol packet is sent to another one of the light devices that is connected to said one of the light devices, and the second protocol packet is also sent to the first wired communication protocol interface by the third microprocessor and the second wired communication protocol interface that is connected to the third microprocessor so as to synchronize dimming parameters of the first user interface of the wired control device.

5. The light control system of claim 4, wherein each of the light devices further comprises:
   a light source;
   a light source driver electrically connected to the light source; and
   a fourth microprocessor connected to the light source driver and the third wired communication protocol interface, wherein the first protocol packet or the second protocol packet received by the third wired communication protocol interface is processed by the fourth microprocessor, such that a new dimming parameter signal is generated and sent to the light source driver to control the light source by the fourth microprocessor.

6. The light control system of claim 1, wherein each of the first and the second wireless communication protocol interfaces is a 3G interface, 4G interface, Wimax interface, Bluetooth interface, WiFi interface, or ZigBee interface.

7. The light control system of claim 6, wherein the first, second, and third wired communication protocol interfaces are half-deplux RS485 communication protocol interfaces.

8. The light control system of claim 4, wherein the dimming parameters of the first and second user interfaces are color temperature, brightness, light beam angles, lighting times, or combinations thereof.

9. The light control system of claim 1, wherein the wireless control device is a mobile calculation device.

10. The light control system of claim 9, wherein the mobile calculation device is a smart mobile calculation device, and an operating system of the smart mobile calculation device is iOS, Android, or Windows that functions to load an APP mobile application) for wirelessly controlling light devices.

11. An integrated wired and wireless light control system, comprising:
    a wired control device comprising a first user interface and a first wired communication protocol interface;
    a wireless control device comprising a second user interface and a first wireless communication protocol interface;
    a communication module comprising a second wired communication protocol interface and a second wireless communication protocol interface;
    M first light devices, each of the first light devices comprising a third wired communication protocol interface, and each of the first light devices performing data exchange with the third wired communication protocol interface of another one of the first light devices by a network cable connected to the third wired communication protocol interface, wherein M is a natural number larger than 1; and a second light device comprising an embedded communication module;

wherein the first wired communication protocol interface directly performs data exchange with the second wired communication protocol interface, and the first wireless communication protocol interface directly performs data exchange with the second wireless communication protocol interface.

12. The light control system of claim 11, wherein the wired control device further comprises:

a first microprocessor connected to the first user interface and the first wired communication protocol interface, receiving a dimming signal from the first user interface and packaging the dimming signal into a first protocol packet, and sending the first protocol packet to the second wired communication protocol interface of the communication module by the first wired communication protocol interface.

13. The light control system of claim 12, wherein the wireless control device further comprises:

a second microprocessor connected to the second user interface and the first wireless communication protocol interface, receiving a dimming signal from the second user interface and packaging the dimming signal into a second protocol packet, and sending the second protocol packet to the second wireless communication protocol interface of the communication module by the first wireless communication protocol interface.

14. The light control system of claim 13, wherein the communication module further comprises a third microprocessor connected to the second wireless communication protocol interface and the second wired communication protocol interface;

wherein when the second wired communication protocol interface of the communication module receives the first protocol packet, the first protocol packet is sent to the third wired communication protocol interface of one of the first light devices by the second wired communication protocol interface, and the first protocol packet is continuously sent to the third wired communication protocol interface of another one of the first light devices, and the first protocol packet is also sent to the first wireless communication protocol interface by the third microprocessor and the second wireless communication protocol interface that is connected to the third microprocessor so as to synchronize dimming parameters of the second user interface of the wireless control device;

wherein when the second wireless communication protocol interface of the communication module receives the second protocol packet, the second protocol packet is sent to the third wired communication protocol interface of one of the first light devices by the third microprocessor and the second wired communication protocol interface that is connected to the third microprocessor, the second protocol packet is sent to another one of the first light devices that is connected to said one of the first light devices, and the second protocol packet is also sent to the first wired communication protocol interface by the third microprocessor and the second wired communication protocol interface that is connected to the third microprocessor so as to synchronize dimming parameters of the first user interface of the wired control device.

15. The light control system of claim 14, wherein each of the first light devices further comprises:

a first light source;

a first light source driver electrically connected to the light source; and a fourth microprocessor connected to the first light source driver and the third wired communication protocol interface, wherein the first protocol packet or the second protocol packet received by the third wired communication protocol interface is processed by the fourth microprocessor, such that a new dimming parameter signal is generated and sent to the first light source driver to control the first light source by the fourth microprocessor.

16. The light control system of claim 14, wherein the second light device further comprises:

a second light source;

a second light source driver electrically connected to the second light source, and connected to the third microprocessor, wherein the first protocol packet received by the second wired communication protocol interface is processed by the third microprocessor, or the second protocol packet received by the second wireless communication protocol interface is processed by the third microprocessor, such that a new dimming parameter signal is generated and sent to the second light source driver to control the second light source by the third microprocessor.

17. The light control system of claim 11, wherein each of the first and the second wireless communication protocol interfaces is a 3G interface, 4G interface, Wimax interface, Bluetooth interface, WiFi interface, or ZigBee interface.

18. The light control system of claim 17, wherein the first, second, and third wired communication protocol interfaces are half-deplux RS485 communication protocol interfaces.

19. The light control system of claim 14, wherein the dimming parameters of the first and second user interfaces are color temperature, brightness, light beam angles, lighting times, or combinations thereof.

20. The light control system of claim 11, wherein the wireless control device is a mobile calculation device.

21. The light control system of claim 20, wherein the mobile calculation device is a smart mobile calculation device, and an operating system of the smart mobile calculation device is iOS, Android, or Windows that functions to load an APP (mobile application) for wirelessly controlling light devices.

* * * * *